United States Patent [19]
Ohmstedt et al.

[11] 3,864,803
[45] Feb. 11, 1975

[54] CARTRIDGE BRUSH HOLDER

[75] Inventors: Harry O. Ohmstedt, Saratoga Springs; William H. Ruth; Edward E. Gibbs, both of Schenectady, all of N.Y.

[73] Assignee: General Electric Company, Schenectady, N.Y.

[22] Filed: Feb. 14, 1974

[21] Appl. No.: 442,506

[52] U.S. Cl. .............................. 29/205 R
[51] Int. Cl. ............................. H02k 15/00
[58] Field of Search .......... 29/205 R, 205 D, 203 H; 310/239, 240

[56] References Cited
UNITED STATES PATENTS

| | | | |
|---|---|---|---|
| 3,006,063 | 10/1961 | Linan | 29/205 R |
| 3,387,155 | 6/1968 | Krulls | 310/239 |
| 3,432,708 | 3/1969 | Bissett | 310/239 |
| 3,628,051 | 12/1971 | Kuibysheva et al. | 310/240 |
| 3,710,478 | 1/1973 | Krulls | 29/205 R |

*Primary Examiner*—Thomas H. Eager
*Attorney, Agent, or Firm*—John F. Ahern; James W. Mitchell

[57] ABSTRACT

The disclosed invention is a device for mounting and maintaining collector ring brushes in a dynamoelectric machine. The device includes a brush box attached to a bus ring and a removable brush holder insertable therein. The brush holder is a U-shaped member having inwardly biased resilient legs which positively engage the brush during maintenance operations. As the brush holder is inserted into the brush box, the resilient legs engage the brush box and are spread to release the brush within the brush box.

9 Claims, 2 Drawing Figures

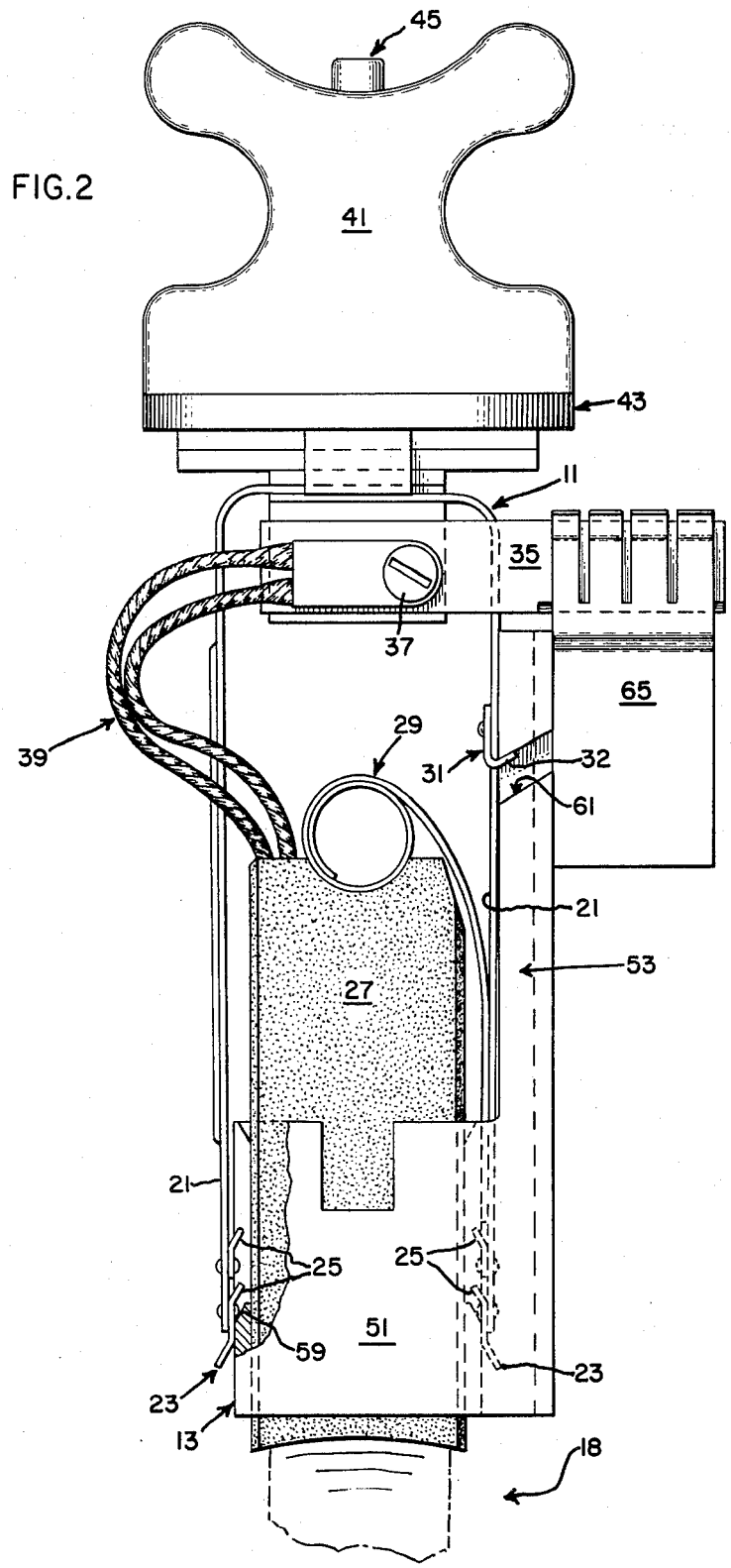

CARTRIDGE BRUSH HOLDER

BACKGROUND OF THE INVENTION

The present invention relates, in general, to dynamoelectric machines; and, in particular, this invention, relates to brush mounting devices positionable adjacent a dynamoelectric machine collector ring.

The prior art includes several brush mounting devices. U.S. Pat. No. 3,387,155 to Krulls, issued June 4, 1968 and assigned to the assignee of the present invention, shows two embodiments of a brush mounting magazine for a plurality of brushes.

U.S. Pat. No. 3,432,708 to Bissett, issued Mar. 11, 1969 and assigned to the assignee of the present invention, shows a brush holder device, with a removable handle, having no positive means for retaining the brush during maintenance operations.

U.S. Pat. No. 3,628,051 to Chigirinshy ulitsa Kuibysheva et al, issued Dec. 14, 1971, shows a brush mounting device where the brush is retained by a spring mounted rod.

U.S. Pat. No. 3,710,478 to Krulls et al., issued Jan. 16, 1973 and assigned to the assignee of the present invention discloses a brush holder having a removable handle and wherein the entire brush holder is removable from the collector ring.

It is one object of the present invention to provide a relatively simple brush mounting device having an improved brush retention means for maintenance.

It is another object of the present invention to provide an improved brush mounting device which may be simply retrofitted to existing dynamoelectric machines.

It is still another object of the present invention to provide a brush mounting device which obviates the use of a rotatable axial rod for activating a brush retention means.

In accordance with one embodiment of the present invention, there is provided a brush holder and brush box. The brush box is fixed to a bus ring and the brush holder is insertable therein. The brush holder is a U-shaped member having a pair of inwardly biased resilient legs terminating in outwardly divergent portions. The brush box includes a rectangular portion having a slot formed in at least two opposite sides. Each slot is formed with an outwardly divergent ramp which engages the outwardly divergent portion of the brush holder to spread apart the resilient legs of the brush holder as it is inserted into the brush box thereby releasing the brush. Additionally, the brush holder includes a clip for further securing the brush holder to the brush box. The brush holder also includes a male electrical contact which is slidably retained in a female electrical contact retained on the brush box and contacting the bus ring or bar.

The novel features believed characteristic of the present invention are set forth in the appended claims. The invention itself, however, together with further objects and advantages thereof, may best be understood with reference to the following description, taken in connection with the appended drawings.

BRIEF DESCRIPTION OF THE DRAWINGS

FIG. 2 is a side elevation view of the brush holder inserted into the brush box.

DETAILED DESCRIPTION OF THE INVENTION

Figure 1:
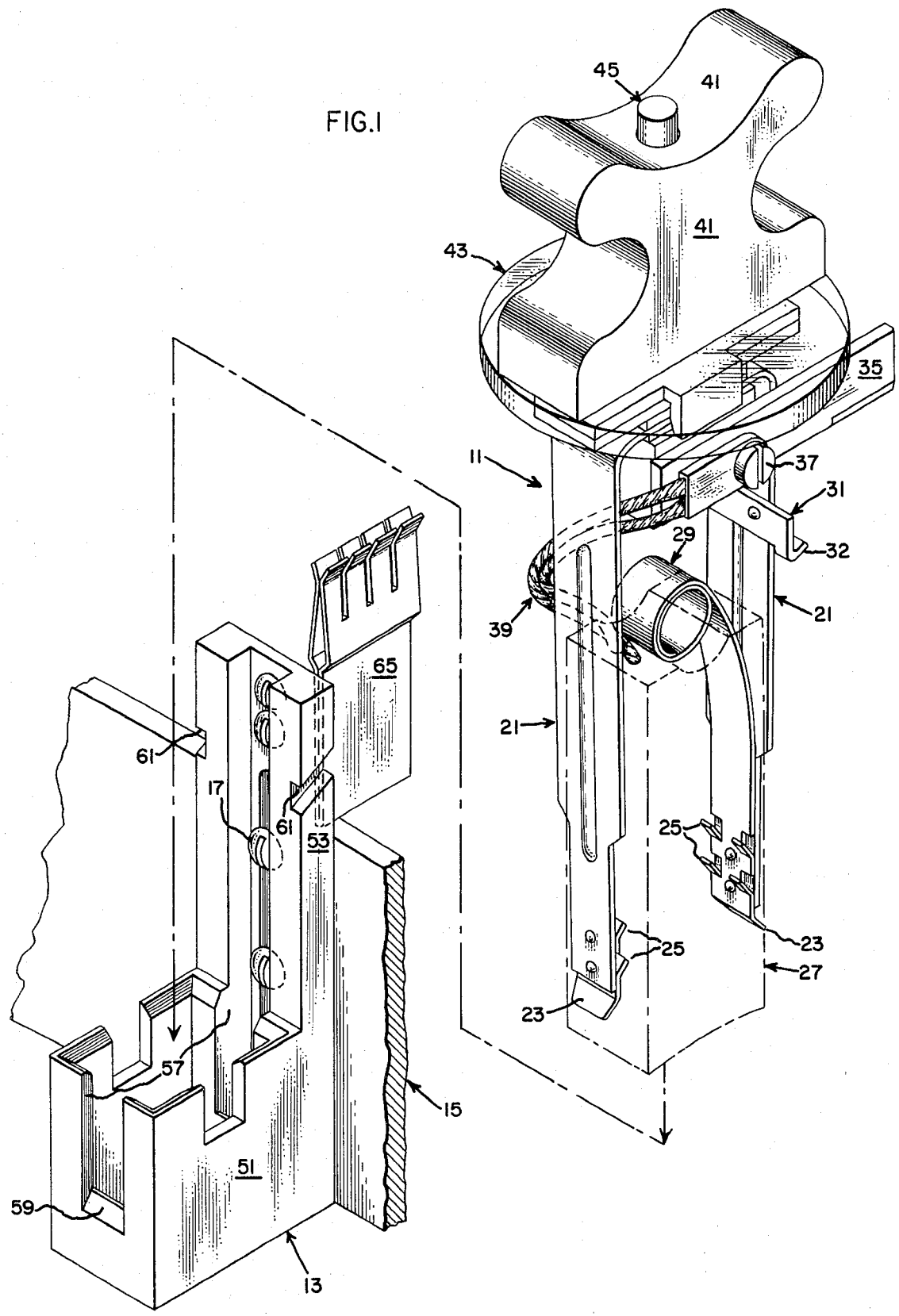
FIG. 1 is an isometric view of the brush holder and brush box with a brush indicated by the phantom lines and the broken arrow line indicating the manner of assembly.

Referring to FIGS. 1 and 2, the brush mounting device includes a brush holder 11 and a brush box 13. The brush box is attached to a bus (bus ring or bus bar) 15 by means of bolts 17. The bus is attached to a dynamoelectric machine frame (not shown) and is mounted adjacent a rotating collector ring 18 as is well known in the art.

The brush holder is a U-shaped member including resilient, inwardly biased legs 21. Each leg terminates in a free end including an outwardly divergent portion 23. Moreover, each leg includes inwardly extending teeth 25 for tightly gripping an electrically conductive brush 27 (indicated in phantom lines). The brush is spring-biased by a coil spring 29 attached to the brush holder, the purpose of which is to bias the brush against a collector ring as is known in the art. A clip 31 is attached to one leg for the purpose of attaching the brush holder to the brush box and includes a pair of upwardly extending inclined tabs 32.

An electrically conductive male connector 35 is attached to the brush holder. Screw 37 is used to attach flexible connector 39 from the brush to the male connector 35.

A removable handle 41 and transparent guard 43 are attached to the brush holder but electrically insulated therefrom. The handle may be of the type including a plunger 45 which when depressed will cause the handle and guard to release from the brush holder.

The brush box 13 includes a rectangular portion 51 and an elongated back portion 53 which abuts the bus 15. The rectangular portion is formed with a pair of slots 57 each including an outwardly divergent ramp at the closed end thereof. As the brush holder is mounted into the brush box, outwardly divergent portions 23, at the free ends of the brush holder, slidably engage ramps 59 to spread apart the inwardly biased brush holder legs thereby causing the brush holder to release the brush to "float" in the rectangular portion of the brush box and in contact with the collector ring under pressure exerted by coil spring 29. Moreover, as is readily apparent from FIG. 2, the interior surfaces of the brush holder legs tightly engage the exterior surfaces of the rectangular portion of the brush box because of the resilient inward bias of the brush holder legs.

The elongated portion of the brush box includes a pair of inclined slots 61 which receive the tabs 32 of clip 31, after the brush holder is inserted into the rectangular portion of the brush box, for further retaining the brush holder in the brush box. The brush box also has a female contact clip 65 into which the male connector 35 from the brush holder is inserted for further holding the brush holder to the brush box and for providing a direct electrical contact from the brush lead to the brush box and bus.

The operation of the invention is as follows. The brush box is fixed to a bus while the brush holder and brush are removable from the brush box and dynamoelectric machine. The handle is removably attached to the brush holder and insulated therefrom so that brush maintenance may occur while the machine is under load and voltage is applied to the brushes. To remove the brush, the handle is attached to the brush holder and pressure is applied on the handle in the direction of the collector ring to free clip 31 from slots 61. Thereafter, the brush holder is pulled away from the collector ring and as the brush holder slides from the rectangular portion of the brush box (tabs 59) the resilient, inwardly biased, legs of the brush holder engage the sides of the brush to provide positive retention of the brush while the brush holder and brush are being removed from the dynamoelectric machine. Insertion is a reverse process with the brush first being released to "float" in the rectangular portion of the brush box and the brush holder clip then engaging the brush box slots 61 on the elongated portion of the brush box.

While there is shown what is considered to be, at present, the preferred embodiment of this invention, it is, of course, understood that various other modifications may be made therein. One such modification might include using the brush mounting device adjacent a commutator ring or in any rotating machine requiring electrical current transfer between a stationary part and a rotating part. It is intended to cover in the appended claims all such modifications as fall within the true spirit and scope of the invention.

What is claimed is:

1. A device for mounting and removing an electrically conductive brush adjacent a dynamoelectric machine rotating part; the device comprising:
    a U-shaped brush holder including a pair of inwardly biased resilient legs for gripping a brush therebetween;
    a brush box attached to the dynamoelectric machine adjacent the rotating parts; and,
    means for biasing apart the brush holder legs as it is inserted into the brush box to release the brush into the brush box.

2. The device recited in claim 1 wherein the brush box includes a rectangular portion having at least two opposite slotted walls and the means for biasing apart the brush holder legs include:
    outwardly divergent ramps in each of the slotted walls for engaging the brush holder legs during insertion into the brush box.

3. The device recited in claim 2 wherein the brush holder further includes an outwardly divergent portion at the free end of each leg for engaging the outwardly divergent ramps of the brush box slotted walls.

4. The device recited in claim 1 wherein the brush holder legs include inwardly extending teeth for gripping an electrically conductive brush.

5. The device recited in claim 1 wherein the brush holder includes a clip defined by a pair of outwardly extending tabs; and, the brush box includes an elongated portion having a pair of slots formed therein for receiving the tabs when the brush holder is seated in the brush box.

6. The device recited in claim 1 wherein the brush holder includes a first electrical connector and the brush box includes a second electrical connector, the first and second electrical connectors being slidably attachable.

7. The device recited in claim 1 wherein the brush holder includes a detachable insulated handle.

8. The device recited in claim 1 wherein the brush holder includes a spring for biasing the brush to the dynamoelectric machine rotating part after the brush is released from the brush holder legs.

9. A device for mounting and removing an electrically conductive brush adjacent a dynamoelectric machine rotating part comprising:
    a U-shaped brush holder including a pair of inwardly biased legs for gripping a brush therebetween; each leg having a free end terminating in an outwardly divergent portion; and,
    a brush box attached, to the dynamoelectric machine, including a rectangular portion for receiving a brush therein; slots formed in the rectangular portion including outwardly divergent ramps adapted to engage the brush holder outwardly divergent portions for releasing the brush from the brush holder.

* * * * *